TRANSISTOR VOLTAGE COMPARATOR CIRCUIT

Filed April 4, 1960 2 Sheets-Sheet 1

INVENTOR.
John G. Koch
BY Mueller & Aichele
Attorney

April 13, 1965 J. G. KOCH 3,178,583

TRANSISTOR VOLTAGE COMPARATOR CIRCUIT

Filed April 4, 1960 2 Sheets-Sheet 2

INVENTOR.
John G. Koch

BY Mueller & Aichele

Attorney

United States Patent Office 3,178,583
Patented Apr. 13, 1965

3,178,583
TRANSISTOR VOLTAGE COMPARATOR CIRCUIT
John G. Koch, Scottsdale, Ariz., assignor to Motorola, Inc., Chicago, Ill., a corporation of Illinois
Filed Apr. 4, 1960, Ser. No. 19,866
8 Claims. (Cl. 307—88.5)

The present invention relates to improved voltage amplitude comparators of the regenerative type, these comparators being generally referred to in the art as "multiars."

A typical multiar circuit includes a discharge tube and a transformer inter-coupling the cathode and grid circuits of the tube. The resultant regenerative feedback is interrupted by a diode in the secondary circuit of the transformer. The diode is normally biased to a nonconductive state by a known reference voltage. When the amplitude of an unknown voltage introduced to the circuit increases sufficiently to overcome the bias on the diode, the feedback path is completed and the circuit begins to oscillate. The circuit may be constructed in this manner to generate a sharp pulse when the known and unknown voltages reach a common value. In practice, the reference voltage may take different forms, for example it may have the form of a saw-tooth, or ramp signal which is an accurate linear function of time.

Accordingly, in such a multiar circuit, when the amplitude of the linear ramp signal equals the amplitude of the unknown voltage a pulse is generated due to the resulting regenerative action of the circuit. Therefore, the time interval between the time of origin of the ramp signal and the time at which the regenerative action is initiated is directly proportional to the amplitude of the unknown signal. Conversely, instead of using a ramp reference signal, the reference signal may be a fixed known value, and the unknown signal may vary as a function of time. In either event, the multiar circuit will generate a pulse each time the magnitude of the unknown signal equals the magnitude of the reference signal.

The multiar circuit has a wide range of applications. For example, the circuit may be used for ranging purposes in a radar system; it may be used in many types of analog-digital systems, it may be used in linear modulator circuits, and in many other applications.

An object of the present invention is to provide an improved multiar circuit which is susceptible to miniaturization, which is light in weight and exhibits extremely low power requirements.

Another object of the invention is to provide such an improved multiar circuit which exhibits an extremely short time constant in its input circuit so as to have an extremely fast transition time from its inactive to its regenerative state when the reference and unknown signals reach their condition of amplitude equality.

Yet another object of the invention is to provide such an improved multiar circuit which has no tendency to enter into a sustained oscillatory condition, even when ramp potentials of relatively small slope are applied thereto, in order to produce a single sharp output pulse upon the condition of amplitude equality referred to above.

A feature of the invention is the provision of an improved multiar circuit which is designed and constructed to incorporate transistors so that the above mentioned objectives as to miniaturization, lightness and low power consumption may be realized and in which the long time constant requirements encountered in the prior art circuits of this general type are successfully overcome.

Another feature of the invention is the provision of such an improved transistorized multiar circuit which exhibits an extremely fast transition time from its inactive to its regenerative state, and which includes improved control means for preventing sustained oscillations in the circuit in the presence of a relatively slow rising ramp reference signal.

A further object of the invention is to provide such an improved multiar circuit which is constructed so as to permit a plurality of similar multiar circuits to be driven from a common ramp generator, and to allow the circuits to be so controlled with a minimum of interaction therebetween. The embodiment of the invention to be described realizes this latter objective by providing negligible reaction in the ramp signal by the individual multiar circuits as each is successively activated by the common ramp signal.

The above and other features of the invention are specifically defined in the claims. The invention itself, however together with further objects and advantages thereof, may best be understood by reference to the following specification when considered in conjunction with the accompanying drawings, in which:

Figure 1:
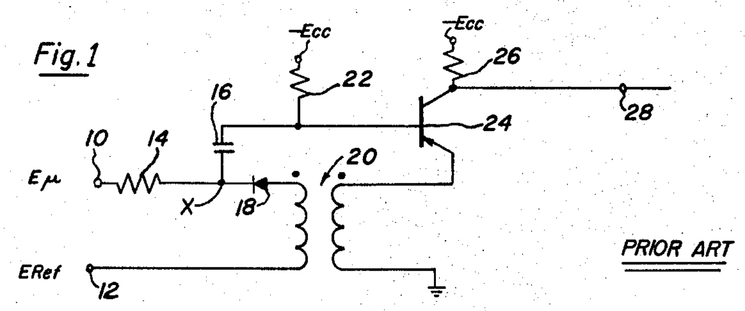
FIGURE 1 is a prior art transistorized multiar circuit useful in explaining the principle upon which the improved circuit of the present invention is predicated.

The circuit diagram of FIGURE 1 includes a first input terminal 10 to which the unknown voltage $E_u$ is introduced, and the circuit also includes a second input terminal 12 to which the reference voltage $E_{ref}$ is applied. As mentioned above, the reference signal may take the form of a ramp, or saw-tooth signal. The terminal 10 is connected to a resistor 14, and the resistor is connected to a capacitor 16 and to the cathode of a diode 18. This junction point is designated X in FIGURE 1. The anode of the diode 18 is connected to the secondary winding of a transformer 20, as is the input terminal 12.

The capacitor 16 is connected to a resistor 22 and to the base of a transistor 24. The resistor 22 may be connected to the negative terminal of a source $E_{cc}$, the positive terminal of this source being connected to a point of reference potential, such as ground. The transistor 24 may be of the PNP type. The collector of that transistor is connected to a resistor 26 and to an output terminal 28. The resistor 26 may also be connected to the negative terminal of the source $E_{cc}$. The emitter of the transistor 24 is connected to the primary of the transformer 20, and the other terminal of the primary is grounded.

In the prior art circuit of FIGURE 1, the transistor 24 is a PNP type, as mentioned above. This transistor is normally held in a saturated condition by the proper choice of the base bias resistor 22 and of the base bias potential $E_{cc}$. A positive going ramp signal ($E_{ref}$) is applied to the input terminal 12, as mentioned above. An unknown positive direct current voltage ($E_u$) is introduced to the input terminal 10, as also mentioned above.

Under initial conditions, the diode 18 is non-conductive because the unknown voltage ($E_u$) is assumed to be initially more positive than the ramp signal ($E_{ref}$). However, the amplitude of the ramp signal rises linearly with time, and when the amplitude of the reference ramp signal becomes equal to the amplitude of the unknown signal, the diode 18 is rendered conductive. The conductivity of the diode 18 effectively couples the ramp signal to the junction X, and this permits current to flow in the circuit including the secondary of the transformer 20, through the diode 18 and through the resistor 14.

When the diode 18 is rendered conductive, the ramp signal is introduced to the junction point X of the resistor 14 and capacitor 16, as noted above. The potential of the point X now rises at the same rate as the amplitude of the ramp signal. The capacity of the capacitor 16 is made sufficiently large so that the ramp signal may be introduced to the base electrode of the transistor 24 with no appreciable attenuation. The introduction of the positive-going ramp signal to the base of the transistor immediately starts to reduce the base current. This is because the positive-going ramp signal has an amplitude increasing in a direction which tends to produce base current cut-off in the transistor.

The reduction of the base current in the transistor 24, under the action of the ramp signal as described in the preceding paragraph, causes the collector current of the transistor likewise to decrease, this latter effect being due to the current gain of the transistor. This reduction in collector current causes a voltage to be developed across the primary winding of the transformer 20 in a direction to oppose this change in current. In the prior art circuit illustrated in FIGURE 1, this voltage is a positive pulse.

By transformer action in the transformer 20, the above mentioned positive pulse developed across the primary winding produces a stepped-up pulse across the secondary winding of the transformer, and the latter pulse is applied to the base electrode of the transistor through the diode 18 and through the capacitor 16 in parallel with the ramp signal. The stepped-up pulse applied to the base electrode of the transistor 24 tends further to decrease the base current in the transistor. This regenerative action continues until the base electrode is driven to the cut-off point of the transistor to reduce the emitter current to zero. The base potential now decays exponentially along the line A in FIGURE 2, and the time for the base potential to decay is dependent upon the time constant of the resistance-capacitance circuit 14, 22 and 16, and the potential difference between $-E_{cc}$ and $E_u$.

Figure 2:
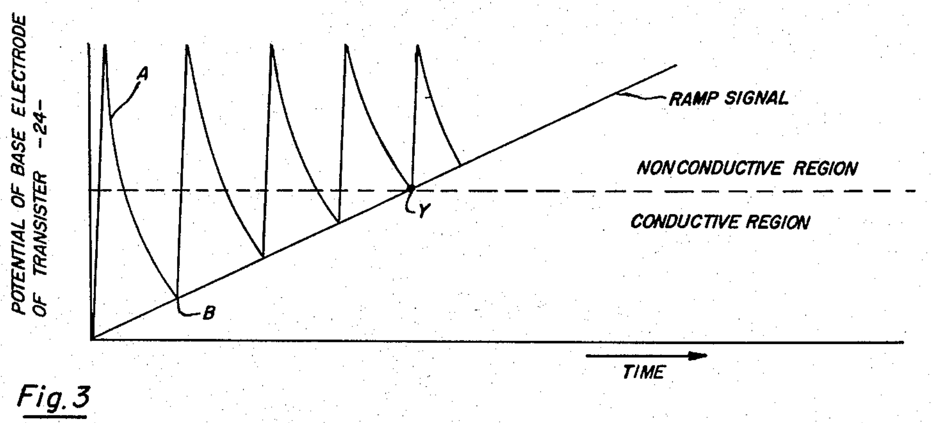
FIGURE 2 is a series of curves illustrating the operation of the system of FIGURE 1 and showing how recurrent oscillations can occur in that system.

As indicated in FIGURE 2, the curves illustrated therein represent the potential of the base electrode of the transistor 24 plotted as a function of time. The dotted line in FIGURE 2 represents the division between the conductive and non-conductive states of the transistor. When the base electrode potential lies above the dotted line the transistor is rendered non-conductive, and when the base potential drops below that line the transistor is rendered conductive.

If the time constant of the resistance-capacitance circuit 14, 22 and 16 is too short with respect to the slope of the ramp signal, as shown in FIGURE 2, the base current will decay to a point B below the dotted line. This produces a base potential within the conductive region of the transistor and regeneration will again occur. This action results in recurrent oscillations being generated by the multiar until sufficient time has elapsed for the relatively slow rising ramp signal to raise the potential of the base electrode of the transistor 24 above the dotted line and out of the conductive region of the transistor. Beyond the point Y in FIGURE 2, the ramp signal maintains the base potential of the transistor 24 at a value to maintain the transistor non-conductive. This recurrent oscillation encountered in the prior art circuits, such as the prior art circuit of FIGURE 1, is entirely unsatisfactory. For most, if not all, multiar applications a single pulse only is desired upon the amplitude of the unknown signal and the amplitude of the ramp signal reaching an equality condition.

One means for preventing the recurrent oscillations shown in FIGURE 2 would be to connect a capacitor between the base electrode of the transistor 24 and ground. However, because of the low input impedance of the saturated transistor 24 an extremely large capacitor would be required. This capacitor would provide normally a relatively long time constant in the input circuit of the transistor, with a correspondingly long transition time being required for the transistor to move from its conductive to its non-conductive state at the time of the equality condition between the unknown and reference signals. In fact, when a capacitor having a value large enough to prevent recurrent oscillations in the circuit is so connected to the base of the transistor, that capacitor would prevent any regenerative action from occurring in the system.

In accordance with the concepts of the present invention, circuitry is incorporated into the circuit of FIGURE 1 which has no adverse effect on the initial transition time of the circuit from its conductive to non-conductive state, and yet which serves positively to prevent recurrent oscillations in the circuit. The concepts of the present invention may be embodied in improved circuitry to be described in conjunction with FIGURE 3. This improved circuitry includes an auxiliary transistor which is normally in a non-conductive condition. This transistor functions as a switch, and it is direct-coupled to the output of the multiar. The output of the auxiliary transistor circuit is capacitively coupled to the base of the multiar transistor 24.

Figure 3:
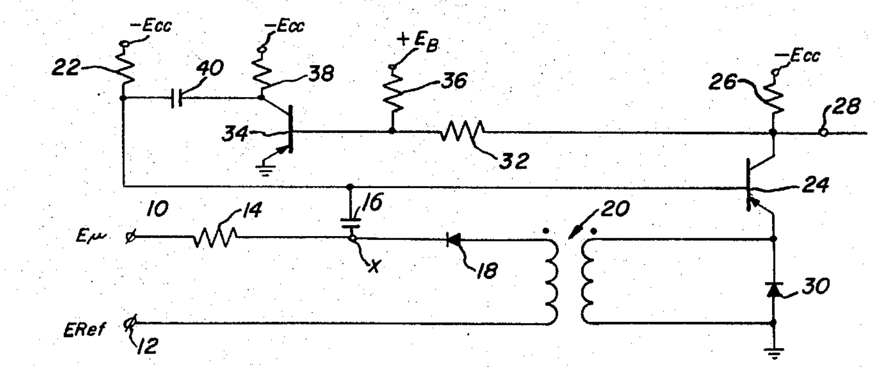
FIGURE 3 is a circuit diagram of the system of FIGURE 1 modified to incorporate the concepts of the present invention and including control means for preventing such recurrent oscillations in the system.

In the circuit of FIGURE 3, the primary winding of the transformer 20 is shunted by a diode 30. The anode of the diode 30 is grounded, and the cathode of that diode is connected to the emitter of the transistor 24. The collector of the transistor 24 is connected to a resistor 32. The resistor 32, in turn, is connected to the base of a transistor 34 and to a resistor 36. The resistor 36 is connected to the positive terminal of a biasing source $E_B$, and that source provides a positive bias for the base of the transistor 34.

The transistor 34 is a PNP type. The emitter of that transistor is grounded, and its collector is connected to a resistor 38 and to a capacitor 40. The resistor 38 is connected to the negative terminal of the source $E_{cc}$, and the capacitor 40 is connected to the base of the transistor 24.

Now, as the ramp signal $E_{ref}$ increases past the point at which the diode 18 is conductive. the base potential of the multiar transistor 24 increases to decrease the collector current thereof, as explained above. This decrease in the collector current causes the potential of the collector of the transistor 24 to swing from zero toward $-E_{cc}$. This, in turn, causes the base potential of the transistor 34 to swing in the negative direction so that the transisor 34 becomes conductive.

The initial regenerative action of the multiar circuit, as described above, rapidly drives the transistor 34 from its non-conductive condition to a fully conductive, saturated state. Moreover, the speed of the regenerative action in the multiar circuit is increased because the output from the transistor 34 is capacitively coupled through the capacitor 40 to the base of the transistor 24, this providing an additional path for regeneration to occur.

The action described above drives the base of the multiar transistor 24 in a positive direction to a potential such that the transistor 24 is held non-conductive for the duration of the cycle of the ramp signal. Recurrent oscillations in the multiar circuit are therefore prevented, and this is achieved by the proper choice of the capacitor 40.

The transistor 34, as mentioned above, functions as a switch effectively to connect the capacitor 40 between the base of the multiar transistor 24 and ground after the first regenerative cycle has occurred. This switching action occurs because the right hand side of the capacitor 40 is established at the $-E_{cc}$ potential when the transistor 34 is non-conductive, and the right hand side of the capacitor is established at zero or ground potential when the transistor 34 is in its fully conductive saturated condition.

In the described manner, the potential of the base electrode of the multiar transistor 24 can be held above the conductive region of the transistor after the first regenerative cycle and until the capacitor 40 becomes fully charged. Moreover, the value of the capacitor 40 may be so selected that it does not become fully charged until the ramp signal has exceeded the point Y in FIGURE 2. At that time, the ramp signal itself is sufficient to hold the multiar transistor 24 non-conductive so that further oscillations are prevented.

In the manner described above, only one transfer occurs at the time of equality between the magnitudes of the ramp signal and of the unknown signal. Oscillations cannot recur in the multiar circuit if the capacitor 40 is selected to be sufficiently large, as noted, to hold the base potential of the multiar transistor 24 above the dotted line in FIGURE 2 until the ramp signal crosses the point Y for the longest ramp cycle expected.

In addition, the rise time of the initial output pulse from the multiar circuit is not degraded because the capacitor 40 is not connected into the base circuit of the multiar transistor 24 until after the initiation of the first regenerative cycle, which cycle serves to render the transistor 34 conductive. The time constant of the input circuit 14, 16 is minimized because the unknown signal source ($E_u$) looks into a relatively high impedance at the firing time instead of a capacitively loaded base electrode.

Figures 4, 5, 6:
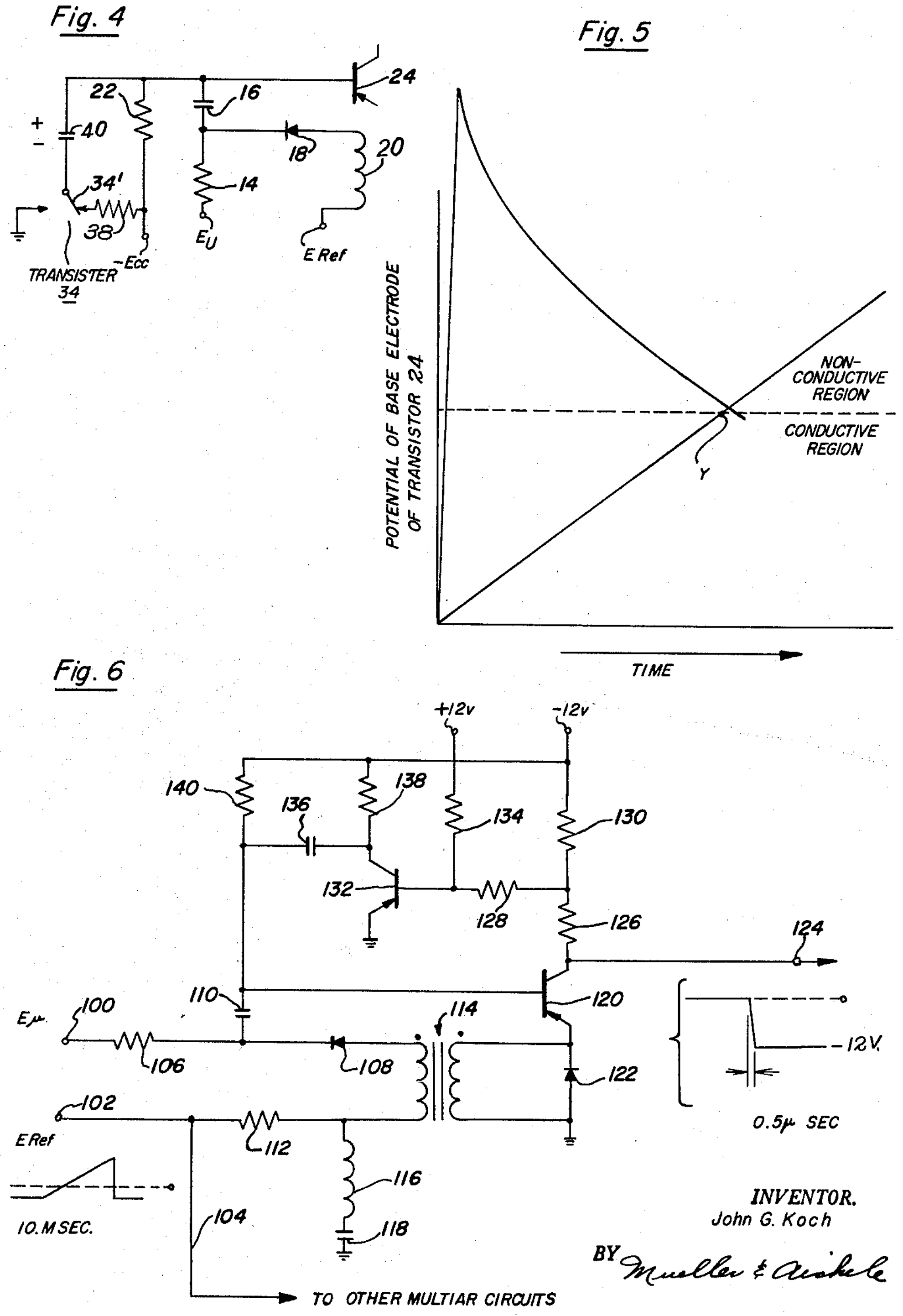
FIGURE 4 is a fragmentary diagrammatic circuit diagram of a portion of the system of FIGURE 3, and serving to explain the manner in which the control means of the invention prevents recurrent oscillation in the system.
FIGURE 5 represents curves showing the operation of the circuit in accordance with the concepts of the invention and illustrating how recurrent oscillations are prevented in the circuit.
FIGURE 6 is a representation of a circuit diagram of a practical commercial embodiment of the improved multiar circuit of the present invention.

The switching action of the transistor 34 is best illustrated in FIGURE 4. In the circuit of FIGURE 4, the transistor 34 has been replaced by an equivalent switch 34'. The switch 34' has an armature connected to the capacitor 40, and the switch has a first fixed contact which is grounded, and a second fixed contact which is connected to the negative terminal of the source $E_{cc}$ through resistor 38. During the initial condition, the transistor 34 is non-conductive, and that state is represented by the illustrated condition of the switch 34'. In the illustrated condition, the armature of the switch engages the $-E_{cc}$ source through resistor 38. Now the capacitor 40 is charged to the potential $E_{cc}$. The capacitor 40 is now effectively out of the base input circuit of the multiar transistor 24. The reference signal $E_{ref}$ may now initiate the regenerative action in the multiar circuit, without that action being affected adversely by the capacitor 40. However, immediately after the first regenerative cycle has been initiated, the transistor 34 becomes conductive, so that the armature of the switch 34' is moved to the grounded fixed contact. The capacitor 40 now begins to discharge and the resulting positive potential across the resistor 22 maintains the potential of the base of the transistor 24 at a value above the dotted line in FIGURE 2.

Therefore, when the transistor 34 is non-conductive, the capacitor 40 is effectively connected across the resistor 22 and is charged to potential $E_{cc}$. Now, when the transistor 34 is rendered conductive, the equivalent switch 34' has its armature connected to the grounded contact and the capacitor 40 is discharged through the resistor 22. The resulting positive charge on the capacitor 40, as explained above, holds the base potential of the multiar transistor 24 above the conductive point, as shown in FIGURE 5, so that the multiar transistor is held non-conductive until the amplitude of the ramp signal passes the point Y. Therefore, any tendency for recurrent oscillations to be set up in the circuit of FIGURE 3 is prevented, and the improved circuit of the invention functions to generate a single sharp pulse at the condition of equality between the reference signal and the unknown signal.

A practical commercial circuit incorporating the concepts of the invention is shown in FIGURE 6. That circuit includes an input terminal 100 to which the unknown signal ($E_u$) is applied. The circuit also includes an input terminal 102 which is coupled to a suitable ramp signal generator to receive the ramp signal $E_{ref}$. A typical waveform for the ramp signal is illustrated adjacent the terminal 102, and the illustrated ramp signal has a rise time of the order of 10 milliseconds. The input terminal 102 is connected to a common lead 104 which may be connected to other similar multiar circuits, as noted.

The input terminal 100 is connected to a resistor 106 which may have a resistance of 33 kilo-ohms. This resistor is connected to the cathode of a diode 108, and that diode may be of the type presently designated 1N629. The resistor 106 is also connected to a capacitor 110, and that capacitor may have a capacity of .068 microfarad.

The input terminal 102 is connected to a limiting resistor 112 which may have a resistance of 2.2 kilo-ohms. The anode of the diode 108 and the resistor 102 are connected to the secondary of a transformer 114. The turns ratio of the transformer 114 may be of the order of 1:2. The junction of the resistor 112 and the secondary of the transformer 114 is connected to an inductance coil 116. This inductance coil may have an inductance of 68 microhenries, and it is connected to a capacitor 118. The capacitor 118 may have a capacity of 1800 micro-microfarads, and it is grounded. The inductance coil 116 and the capacitor 118 form a series resonant circuit.

The capacitor 110 is connected to the base of a PNP transistor 120. That transistor may be of the type presently designated 2N427. The emitter electrode of the transistor 120 is connected to the primary of the transformer 114 and to the cathode of a diode 122. This diode may be of the type designated 1N629. The anode of the diode is grounded, as is the other terminal of the primary winding of the transformer 114. The primary and secondary windings of the transformer 114 are wound with a polarity indicated by the dots adjacent these windings.

The collector of the transistor 120 is connected to an output terminal 124. The output signal developed at that output terminal may have a configuration, such as illustrated by the waveform adjacent the output terminal. That waveform illustrates a negative going transition in the output signal with a rise time of 0.5 microsecond.

The collector of the transistor 120 is connected to a resistor 126 which may have a resistance of 180 ohms. The resistor 126 is connected to the junction of a resistor 128 and a resistor 130. The resistor 130 may have a resistance of 820 ohms, and it is connected to the negative terminal of a 12 volt direct voltage source. The resistor 128 may have a resistance of 10 kilo-ohms, and it is connected to the base electrode of a transistor 132.

The transistor 132 may also be of the type designated 2N427. The transistor 120 functions as the multiar circuit transistor, and the transistor 132 functions as the switching transistor described in conjunction with FIGURES 3 and 4.

The emitter of the transistor 132 is grounded. A resistor 134 is connected to the base of the transistor and to the positive terminal of a 12 volt biasing source. This resistor may have a resistance of 18 kilo-ohms, for example. The collector of the transistor 132 is connected to a capacitor 136. This capacitor may have a capacity of 0.1 microfarad, and it is connected to the base of the transistor 120. The collector of the transistor 132 is also connected to a resistor 138. This resistor may have a resistance of 2.7 kilo-ohms, and it is connected to the negative terminal of the 12 volt direct voltage source. The capacitor 136 is connected to a resistor 140. The latter resistor may have a resistance of 56 kilo-ohms, and it is connected to the negative terminal of the 12 volt direct voltage source.

The operation of the circuit of FIGURE 6 is generally similar to the circuit of FIGURE 3, as described above. The circuit of FIGURE 6 is well suited for use in systems in which a plurality of multiars are driven by a common ramp generator to produce a corresponding plurality of independent output pulses. In general, the reaction of a multiar circuit upon the ramp signal at the firing point is negligible if the firing point of each multiar is sufficiently removed from the firing point of the next adjacent multiar. However, when these firing points are closely adjacent one another there is a tendency for one to synchronize the other.

In the circuit of FIGURE 6, at the firing point when regeneration commences, the secondary of the transformer 114 is driven positive by the sudden change in emitter current through the primary of that transformer. This action tends to produce a pulse on the common ramp line due to the finite impedance of the ramp generator. The other multiars connected to the common ramp generator experience this sudden rise in ramp signal potential, and this rise may be sufficient to pre-fire adjacent multiars operating at a slightly higher firing potential.

To overcome the undesired reaction described above, a low impedance path to ground for the low potential end of the secondary winding of the transformer 114 is provided. This path is formed by the series resonant circuit including the capacitor 118 and inductance coil 116. These components are selected to be approximately resonant over the frequency spectrum corresponding to the pulse appearing across the secondary due to the firing of the multiar.

The series resistor 112 functions as a limiting resistor to provide additional attenuation for any remaining disturbance that might occur on the common ramp line 104. In this manner, the pulse formed across the secondary of the transformer does not cause the ramp potential at the lower end of the secondary to rise because of the low impedance presented by the series resonant circuit 116, 118.

The embodiment of the invention illustrated in FIGURE 6, therefore, in addition to the functions described previously, is also constructed to permit the circuit to be used in a system in which a plurality of multiars are driven by a common ramp signal, and to permit such a use without any tendency for adjacent multiars to synchronize one another.

The invention provides, therefore, a practical and improved transistorized multiar circuit. The concepts of the present invention permit the use of transistors and their attendant advantages in multiar circuits, and yet overcomes the problems previously encountered when the transistorizing of multiar circuits was attempted. By the selective switching of a capacitor into the base circuit of the multiar transistor, the circuit of the invention permits the use of relatively long rise time for the ramp signal without producing recurrent regeneration in the multiar circuit, and this is achieved without affecting the fast transition time of the multiar circuit and without degrading the desired rapid rise time of the output pulse.

I claim:

1. A multiar type of comparator circuit including in combination: a first transistor, biasing circuitry coupled to said first transistor for normally establishing said first transistor in a saturated conductive state, input circuit means coupled to said first transistor, means for introducing to said input circuit means a reference voltage and an unknown voltage at least one of which is varying, a normally non-conductive diode included in said input circuit means for causing said reference voltage to be introduced to said transistor means when said reference and unknown voltages reach a condition of equality, regenerative circuit means coupled to said first transistor and to said input circuit means for causing said first transistor to change to a non-conductive state in response to the introduction thereto of said reference signal, first output circuit means coupled to said first transistor for producing an output pulse upon each change of the state of the first transistor from the conductive to the non-conductive state, a second transistor, second output circuit means connected to said second transistor, capacitor means coupling said second output circuit means to said input circuit means, biasing circuitry coupled to said second transistor for normally establishing said second transistor in a non-conductive state, and circuit means connecting said second transistor to said first transistor to cause the conductive state of said second transistor to be changed to a saturated conductive state when the conductive state of the first transistor is changed to a non-conductive state, said change in the conductive state of said second transistor acting to change the potential on said capacitor means to apply a bias to said first transistor to maintain the same in said non-conductive state to thereby prevent recurrent regenerative action in the regenerative circuit means.

2. A comparator circuit including in combination; transistor means, input circuit means coupled to said transistor means, means for introducing first and second signals to said input circuit means, means included in said input circuit means for causing a control signal to be applied to said transistor means when said first and second signals reach a predetermined relationship, said control signal changing the conductive state of said transistor means, impedance means having a first terminal connected to said transistor means, and a second terminal, means applying a potential to said first terminal, and control means coupled between said transistor means and said second terminal for selectively changing the potential on said second terminal in response to said change in conductive state of said transistor means, said impedance means responding to said changed potential on said second terminal to change the potential on said first terminal to prevent recurrent transitions in conductive state of said transistor means in response to said control signal.

3. A multiar type of comparator circuit including in combination; transistor means, input circuit means coupled to the transistor means, means for introducing first and second signals to said input circuit means, means included in said input circuit means for causing a control signal to be applied to said transistor means when said first and second signals reach a predetermined relationship, regenerative circuit means coupled to said transistor means and to said input circuit means for causing said transistor means to change conductive state in response to the application thereto of said control signal, capacitor means having a first terminal connected to said transistor means and a second terminal, means applying a potential to said change in the conductive state of said transistor means, said capacitor means responding to said changed changing the potential on said second terminal in response to said change in the conductive state of said transistor means, said capacitor means responding to said changed potential on said second terminal to change the potential on said first terminal to prevent recurrent regenerative action in said regenerative circuit means in response to said control signal.

4. A multiar type of comparator circuit including in combination; transistor means, input circuit means coupled to said transistor means, means for introducing to said input circuit means a reference voltage and an unknown voltage at least one of which is varying, normally non-conductive diode means included in said input circuit means for causing a control signal to be introduced to said transistor means when said reference and unknown voltages reach a condition of equality, regenerative circuit means coupled to said transistor means and to said input circuit means for causing said transistor means to change its conductive state in response to the introduction thereto of said control signal, output circuit means coupled to said transistor means for producing an output pulse upon each change of the conductive state of said transistor means, capacitor means having a first terminal connected to said transistor means, and a second terminal, means applying a potential to said first terminal, and switching control means coupled between said transistor means and said second terminal for selectively changing the potential on said second terminal in response to said change in the conductive state of said transistor means, said capacitor means responding to said changed potential on said second terminal to change the potential on said first terminal to prevent recurrent regenerative action in said regenerative circuit means in response to said control signal.

5. A multiar type of comparator circuit including in combination; transistor means, input circuit means coupled to said transistor means, means for introducing to said input circuit means a reference voltage and an unknown voltage, said reference voltage being in the form of a ramp signal exhibiting an amplitude varying as a linear function of time, normally non-conductive diode means included in said input circuit means for causing a control signal to be introduced to said transistor means when said reference and unknown voltages reach a condition of equality, regenerative circuit means coupled to said transistor means and to said input circuit means for causing the transistor means to change its conductive state in response to the introduction thereto of said control signal, output circuit means coupled to said transistor means for producing an output pulse upon each change of the conductive state of said transistor means, capacitor means having a first terminal connected to said transistor means and a second terminal, means applying a potential to said first terminal, and switching control means coupled between said transistor means and said second terminal for selectively changing the potential on said second terminal in response to said change in the conductive state of said transistor means, said capacitor means responding to said changed potential on said second terminal to change the potential on said first terminal to prevent recurrent regenerative action in the regenerative circuit means in response to said control signal.

6. A multiar type of comparator circuit including in combination; transistor means, biasing circuitry means coupled to the transistor means for normally establishing the same in a saturated conductive state, input circuit means coupled to said transistor means, maens for introducing to said input circuit means a reference voltage and an unknown voltage at least one of which is varying, normally non-conductive diode means included in said input circuit means for causing a control signal to be introduced to said transistor means when said reference and unknown voltages reach a condition of equality, regenerative circuit means coupled to said transistor means and to said input circuit means for causing the transistor means to change to a non-conductive state in response to the introduction thereto of said control signal, output circuit means coupled to said transistor for producing an output pulse upon each change of said transistor means from the conductive to the nonconductive state, capacitor means having a first terminal connected to said transistor means and a second terminal, means applying a potential to said first terminal, and switching control means coupled between said transistor means and said second terminal for selectively changing the potential on said second terminal in response to said change in the conductive state of said transistor means, said capacitor means responding to said changed potential on said second terminal to change the potential on said first terminal to prevent recurrent regenerative action in said regenerative circuit means in response to said control signal.

7. A multiar type of comparator circuit including in combination, a first transistor, biasing circuitry coupled to said first transistor for normally establishing said first transistor in a saturated conductive state, input circuit means coupled to said first transistor, means for introducing to said input means a reference volage and an unknown voltage at least one of which is varying, a normally non-conductive diode included in said input circuit means for causing said reference voltage to be introduced to said transistor means when said reference and unknown voltages reach a condition of equality, regenerative circuit means coupled to said first transistor to change to a non-conductive state in response to the introduction thereto of said reference signal, said regenerative circuit means including a filter network for preventing the regenerative action therein from affecting the wave form of said reference voltage, output circuit means coupled to said first transistor for producing an output pulse upon each change of the state of the first transistor from the conductive to the non-conductive state, capacitor means, a second transistor connected to said capacitor means, biasing circuitry coupled to said second transistor for normally establishing said second transistor in a non-conductive state, and circuit means connecting said second transistor to said first transistor to cause the conductive state of said second transistor to be changed to a saturated conductive state when the conductive state of the first transistor is changed to a non-conductive state so as to effectively connect said capacitor into circuit with said input circuit means upon such change in the conductive state of said first transistor to said non-conductive state so as to prevent recurrent regenerative action in the regenerative circuit means.

8. A multiar type of comparator circuit including in combination: a first transistor, biasing circuitry coupled to said first transistor for normally establishing said first transistor in a saturated conductive state, input circuit means coupled to said first transistor, means for introducing to said input circuit means a reference voltage and an unknown voltage at least one of which is varying, a normally nonconductive diode included in said input circuit means for causing said reference voltage to be introduced to said transistor means when said reference and unkown voltages reach a condition of equality, regenerative circuit means coupled to said first transistor and to said input circuit means for causing said first transistor to change to a non-conductive state in response to the introduction thereto of said reference signal, said regenerative circuit means including a transformer and further including a series of resonant circuit connected to said transformer and to a point of reference potential for preventing the regenerative action in said regenerative circuit means from affecting the wave form of said reference voltage, output circuit means coupled to said first transistor for producing an output pulse upon each change of the state of the first transistor from the conductive to the non-conductive state, capacitor means, a second transistor connected to said capacitor means, biasing circuitry coupled to said second transistor for normally establishing said second transistor in a non-conductive state, and circuit means connecting said second transistor to said first transistor to cause the conductive state of said second transistor to be changed to a saturated conductive state when the conductive state of the first transistor is changed to a non-conductive state so as to effectively connect such capacitor into circuit with said input circuit means upon such change in the condutive state of said first transistor to said non-conductive state so as to prevent recurrent regenerative action in the regenerative circuit means.

References Cited by the Examiner

UNITED STATES PATENTS

| | | | |
|---|---|---|---|
| 2,726,329 | 12/55 | Henderson | 328—169 |
| 2,779,870 | 1/57 | Henry et al. | 328—146 |
| 2,791,689 | 5/57 | Stillwell | 328—146 |
| 2,983,830 | 5/61 | Kneale | 307—88.5 |

JOHN W. HUCKERT, *Primary Examiner.*

GEORGE N. WESTBY, ARTHUR GAUSS, *Examiners.*